Patented Oct. 27, 1925.

1,559,478

UNITED STATES PATENT OFFICE.

HEINRICH UMBER, OF BERLIN, GERMANY, ASSIGNOR TO JOHANN A. von WÜLFING, OF BERLIN, GERMANY.

PROCESS OF MAKING A CALCIUM PREPARATION.

No Drawing.   Application filed May 28, 1923.   Serial No. 642,107.

*To all whom it may concern:*

Be it known that I, HEINRICH UMBER, a citizen of the German Republic, residing at Berlin, Germany, have invented new and useful Improvements in Processes of Making a Calcium Preparation, of which the following is a specification.

My invention relates to improvements in the process of making a calcium preparation and the preparation obtained thereby.

Heretofore a pharmaceutical preparation has been on the market which consists of 2 molecules of sodium lactate, 1 molecule of calcium lactate, and 4 molecules of water, which is readily absorbed, and which is obtained by directly mixing calcium lactate of the trade and sodium lactate of the trade. The object of the improvements is to provide a preparation which has a good taste and is free of objectionable odor. With this object in view the invention consists in starting in the manufacture of the preparations from the free lactic acid, which is obtained by distillation or other processes in a much purer state than the said salts of the trade. Another object of the improvements is to carry out the process in such a way that the said double salt is directly obtained without evaporation.

With these objects in view I proceed as follows:

A high percentage lactic acid (2 molecules) is neutralized with the equivalent amount of high percentage caustic soda (2 molecules), and while the solution is still hot 2 molecules of high percentage lactic acid are added. Thereafter the said lactic acid is neutralized by means of quick lime (1 molecule). Thereby the solution is heated to boiling temperatures so that a considerable part of the water is evaporated. After adding the whole amount of lime a clear, hot, syrupy mixture is obtained which when allowed to stand is solidified into a loose white product of increased volume from which product the last traces of water are removed by pressing the same through a sieve and moderately drying the same.

The product has a mild taste and is free of the objectionable odor of the butic acid.

Example: To 480 parts by weight of a 75% lactic acid I add 320 parts of a 25% caustic soda lye, and to the solution I add 56 parts by weight of quicklime, the lime being gradually added in small portions. Thereby the mass is heated to boiling temperature, and a considerable amount of the water is evaporated. The product is solidified into a loose white product from which the residue of the water in excess—the double compound contains 4 molecules of water of crystallization—is removed by pressing the same through a sieve and drying the same.

I claim:

1. The process of manufacturing a calcium preparation which consists in mixing together highly concentrated lactic acid, a corresponding amount of concentrated caustic soda and quicklime, and drying the resulting product at low temperature.

2. The process of manufacturing a calcium preparation which consists in mixing together highly concentrated lactic acid and a corresponding amount of concentrated soda lye, gradually adding quicklime in small portions, and drying the resulting product at low temperature.

3. The process of manufacturing a calcium preparation which consists in mixing together highly concentrated lactic acid and a corresponding amount of concentrated caustic soda, gradually adding thereto quicklime in small portions thereby heating the mixture and by the resulting evaporation of water solidifying the product, and finally pressing the product through a sieve.

4. The process as set forth in claim 3, which comprises the further step of drying the product.

5. As a new composition of matter, a calcium preparation of great purity comprising sodium lactate, calcium lactate, and water of crystallization produced by a mixture of highly concentrated free lactic acid, caustic soda and quicklime.

In testimony whereof I have signed my name to this specification.

HEINRICH UMBER.